US011497593B2

(12) United States Patent
Butterworth

(10) Patent No.: US 11,497,593 B2
(45) Date of Patent: Nov. 15, 2022

(54) LIVESTOCK TREATMENT METHOD AND APPARATUS

(71) Applicant: Richard John Butterworth, Mount Eliza (AU)

(72) Inventor: Richard John Butterworth, Mount Eliza (AU)

(73) Assignee: R & M Butterworth Pty Ltd., Mount Eliza (AU)

( * ) Notice: Subject to any disclaimer, the term of this patent is extended or adjusted under 35 U.S.C. 154(b) by 1304 days.

(21) Appl. No.: 15/619,739

(22) Filed: Jun. 12, 2017

(65) Prior Publication Data

US 2017/0273770 A1 Sep. 28, 2017

Related U.S. Application Data

(63) Continuation-in-part of application No. 14/251,604, filed on Apr. 13, 2014, now abandoned.

(51) Int. Cl.
*A61D 11/00* (2006.01)
*A61D 7/04* (2006.01)
(Continued)

(52) U.S. Cl.
CPC ............ *A61D 11/00* (2013.01); *A01K 1/0613* (2013.01); *A61D 7/00* (2013.01); *A61D 7/04* (2013.01); *A01K 1/06* (2013.01); *A61D 2003/003* (2013.01)

(58) Field of Classification Search
CPC ...... A61M 11/00–005; A61M 2202/00; A61M 2202/0007; A61M 2202/06;
(Continued)

(56) References Cited

U.S. PATENT DOCUMENTS 2,529,530 A * 11/1950 Abildgaard ......... A01M 13/003 119/669
4,347,285 A * 8/1982 Batdorf .................. C04B 28/26 106/629

(Continued)

FOREIGN PATENT DOCUMENTS

DE 4003989 2/1990
WO 2005055984 A1 6/2005
(Continued)

OTHER PUBLICATIONS

Alina Chervinskaya, Halotherapy in controlled salt chamber microclimate for recovering medicine. Balneologia Polska 2 (2007): 133-141.
(Continued)

*Primary Examiner* — Kathryn E Ditmer
(74) *Attorney, Agent, or Firm* — Benjamin Aaron Adler

(57) ABSTRACT

Provided is a method for treating animals, such as livestock, by exposing the animals to an airborne suspension of finely divided mineral salts. Treatment is effected upon inspiration of the mineral salts or skin contact with the mineral salts. The animals are accommodated in a treatment chamber with a substantially sealed limited confined volume and has a pressure difference airflow means, a dispensing means for the mineral salts and desiccant(s) in the walls and on the floor of the treatment chamber. The treatment chamber is a (Continued)

stationary installation or adapted as a trailer to treat animals during a journey or to transport the treatment chamber to the animals location, for example, a zoo or to apiaries.

23 Claims, 2 Drawing Sheets

(51) Int. Cl.
*A01K 1/06* (2006.01)
*A61D 7/00* (2006.01)
*A61D 3/00* (2006.01)

(58) Field of Classification Search
CPC ........ A61M 2202/064; A61M 2205/00; A61M 16/16; A61M 15/00; A61M 15/0003–001; A61M 15/002; A61M 15/0021; A61M 15/0028; A61M 15/0033; A61M 15/0045; A61M 15/0051; A61M 15/0065; A61M 15/0085; A61M 15/0086–0088; A61M 15/06; A61M 15/08–085; A61G 10/00; A61G 10/02; A61J 1/10; A61J 1/142; A61J 1/2006–2017; A61K 9/14–16; A61K 9/51; A01K 1/00–0035; A01K 1/0058; A01K 1/0064; A01K 13/003
See application file for complete search history.

(56) References Cited

U.S. PATENT DOCUMENTS

| | | | | |
|---|---|---|---|---|
| 6,854,460 | B1* | 2/2005 | Shofner, II | A61M 15/0065 128/203.12 |
| 7,234,269 | B2* | 6/2007 | Yonker | A01M 1/2038 119/417 |
| 2002/0128225 | A1* | 9/2002 | Liu | A61P 11/06 514/56 |
| 2008/0066740 | A1 | 3/2008 | Hintergardt et al. | |
| 2009/0314216 | A1 | 12/2009 | Polak et al. | |
| 2013/0087103 | A1* | 4/2013 | Glazman | A01K 1/0047 119/448 |

FOREIGN PATENT DOCUMENTS

| | | |
|---|---|---|
| WO | 2008084269 A3 | 7/2008 |
| WO | 2008092465 A1 | 8/2008 |
| WO | 2011100981 A1 | 8/2011 |

OTHER PUBLICATIONS

Halotherapy Products by Polar Health—Webpage (published Sep. 22, 2012).

Respira Salt Therapy Rooms. www.respirasalt.com/Home_Page.html.

\* cited by examiner

LIVESTOCK TREATMENT METHOD AND APPARATUS

TECHNICAL FIELD

This invention concerns a treatment method for animals and apparatus for performing the method.

The method is intended for horses and greyhounds but may be beneficial to livestock generally and cattle in particular. A large proportion of the body weight of a racehorse and greyhound is skeletal muscle. They have large lung capacity to match because the combination permits them to run at speed. To maximise and maintain speed, the respiratory system must work perfectly and performance depends on the airways maximising the flow of air to the lungs. Any constriction leads to panting and reduction in performance.

BACKGROUND

The extent and frequency of impairment is only evident to trainers who are in constant contact with the horses and dogs in their care. When skin ailments are active they are visible as rashes, surface ulcers, wounds, bruises, swelling and the like and topical or systemic treatment can be planned. When respiratory problems are spoiling the animals performance or recovery from training the cause is often discernable. Heavy panting may indicate blockage of airways with mucus or sputum. While infections by bacteria may be treatable with antibiotics, these frequently disturb the animal through side effects. If the infection is viral the position is less treatable because there are relatively few anti-virals. So there is a need for a treatment which is rapid in effect and simple to administer.

A veterinary inspection is a usual step and the introduction of a diagnostic camera helps to show to what extent the airways are not performing as they should. This sort of inspection may be done between training sessions. Once the airways are shown to be the source of slow speed rather than body pain or systemic infection then localised treatment can be planned.

Trainers like treatments which are rapid in effect so that time lost in training is minimised. This is particularly so when a horse is recovering from travel fatigue. This condition is common and can subtract severely from a training program. This shows as general debility and may last for weeks.

SUMMARY OF INVENTION

The apparatus aspect of the invention provides a chamber for temporary accommodation of one or more animals to be treated with means to cause an airstream in the chamber and dispensing means for adding finely divided mineral salts which form a suspension when dispensed into the airstream.

The dispensing means may include a comminuter for reducing the crystalline or amorphous salts to a particle size suitable for air suspension, namely 5-15φ.

The airstream may be created by a fan such as an axial flow fan.

The chamber may have surfaces which resist deposition of the salt particles.

The chamber may have a desiccator which can be covered and uncovered in order to remove excess water vapour from the air.

The chamber may have floor cleaning apparatus for example a mobile manure scoop.

The method aspect of the invention provides a method of contacting the cell surfaces of livestock which are in contact with the atmosphere with finely divided mineral salts in airborne suspension, including the steps of confining the animal in a chamber and exposing the animal to an airstream which contains the suspension, whereby the salts are inspired and optionally repeating the exposure.

The method further includes a dispersing finely ground mineral salts in an airstream created in a chamber containing an animal to be treated and keeping the animal in the chamber for a period sufficient for the salts to be consumed by inspiration of the animal or deposited on the animals skin.

A mixture of salts are preferable. The dose may vary according to the severity of the condition 5 g, 10 g, 15 g and 20 g/m<3> being the preferred range. The frequency may also vary according to the severity and may be daily or 1-6 sessions per week. The sessions may last 15-45 minutes.

Periodically the air in the chamber may be exposed to a desiccator in order to reduce the humidity caused by the expiration and perspiration of the animals.

The walls, floors and ceiling tend to become coated with the salts particles and those which contain water of crystallization such as magnesium salts cause moist surfaces to persist. Some salts are deliquescent and these produce a water film on the floor. It is useful to dust the chamber floor with common salt, preferably sea salt and a desiccating agent such as calcium chloride.

The salt for airborne suspension may be phosphates, sulphates, chlorides and fluorides of sodium, potassium, calcium, magnesium and iron.

Advantageous Effects of Invention

1. Respiratory problems clear up and a return to training occurs sooner. Bleeding and mucus production in the airways diminishes. Attacks of pharyngitis moderate.
2. Travel sickness is dispelled.
3. Skin complaints are alleviated.

BRIEF DESCRIPTION OF DRAWINGS

The embodiment of the invention is now described with reference to the accompanying drawings in which.

DESCRIPTION OF THE INVENTION

Figure 1:
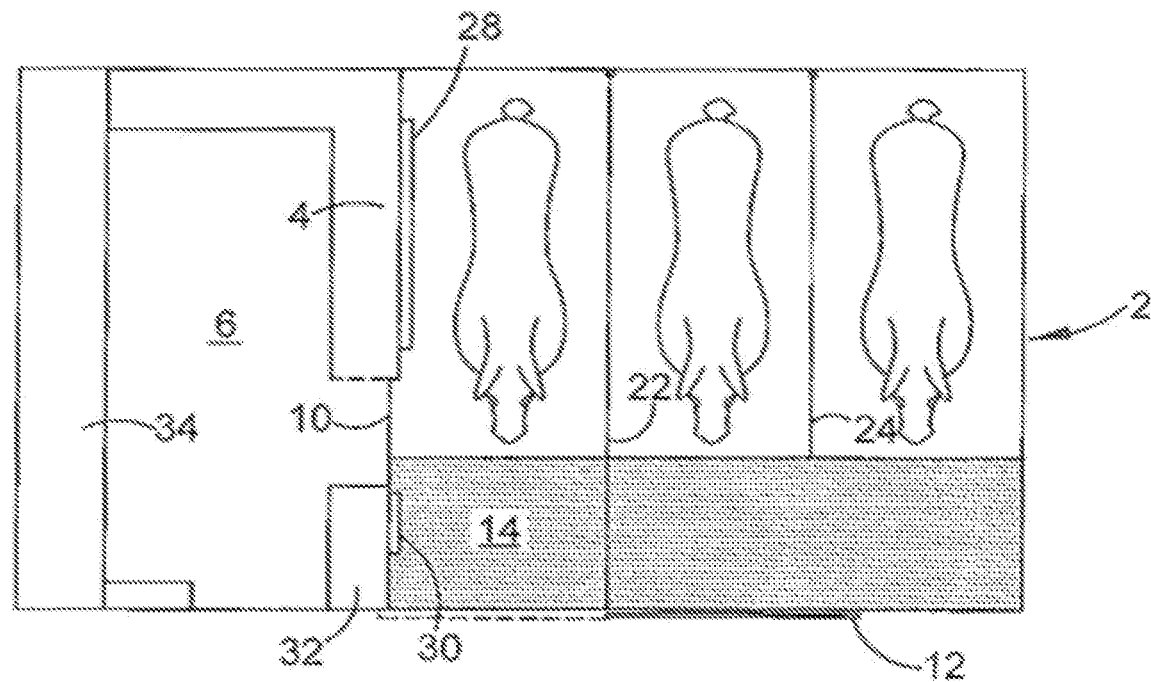
FIG. 1 is a plan of a therapy chamber for three horses with adjoining staff and record space.
Figure 2:
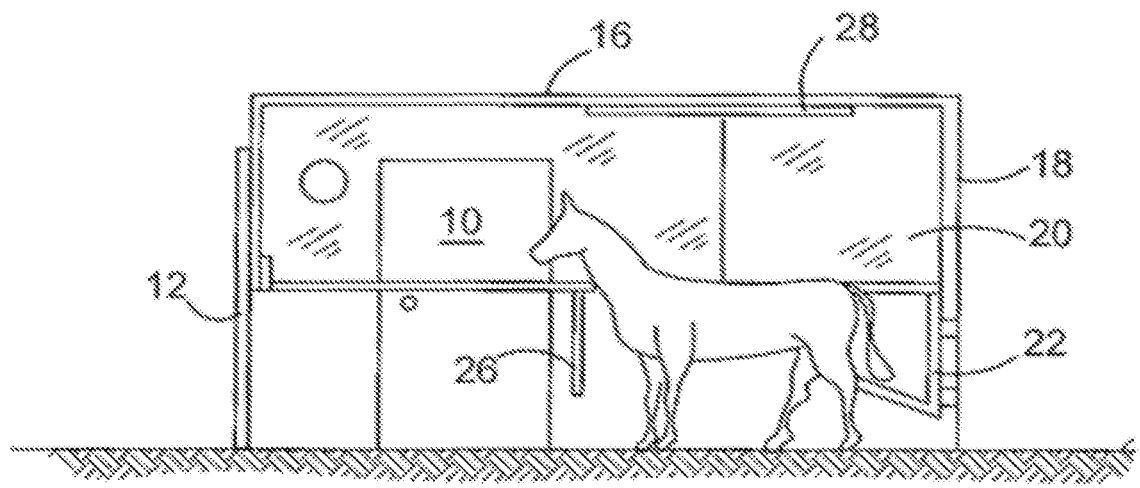
FIG. 2 is a side view of the chamber in FIG. 1.

Referring to FIGS. 1 and 2, the treatment chamber 2 is a room 5 m×4.5 m with a partition wall 4 which divides the staffroom 6 from the animal area 8. Door 10 allows access from the staffroom to the animal area. Door 12 acts as entrance and exit to the animals. The floor is concrete and a strip 1 m wide 14 is covered with chemical desiccant to a depth of 20-25 mm. This is a mixture of vermiculite, perlite and calcium chloride.

The ceiling 16 and upper walls 18 are covered with panels 20 which are coated with desiccant but which after initial use become coated with a second layer of treatment salts.

Gate 22 pivots left and right and fastens to the frame of door 10. Shorter gate 24 divides the animal space into a second and third stalls for accommodating two more animals. Collar ties 26 hang from the gates to restrain lively animals. A fluorescent light 28 illuminates the chamber.

Partition wall 4 has an aperture 30 through which air is blown by the salt dispenser 32 mounted on the wall of the staffroom 6. Desk space and record keeping containers 34 occupy one wall of the staffroom.

Figure 3:
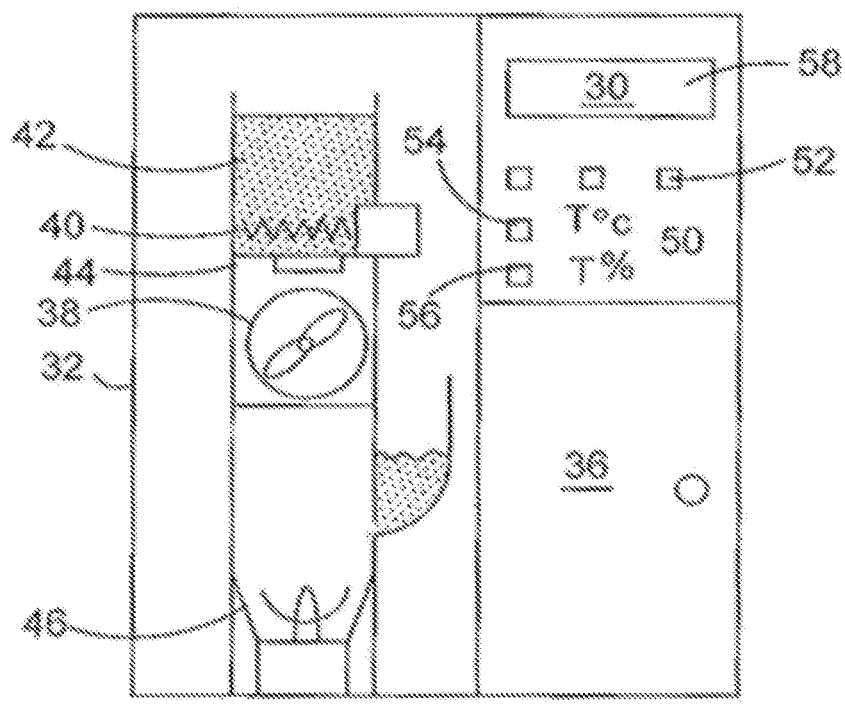
FIG. 3 is the salt dispensing apparatus.

Referring now to FIG. 3, the wall mounted salt dispenser 32 has a storage compartment 36 beside the axial flow fan 38. Above the fan is a grinder 40 having an electrically driven screw which is fed by a reservoir 42 of about 1 kg capacity. The screw reduces any lumps to a fluent crystalline mix which falls into a collector drawer 44 beneath the grinder.

The contents of the drawer are transferred to a measuring cup (not shown) and then tipped into a comminuter 46 which has electrically driven cutting blades. A restrictor causes the crystals to fall by gravity into the blades' path in a steady stream. The blades propel the powder produced by the comminuter upwardly into the airstream generated by an axial flow fan 38.

The fan is of 500 l/min capacity. The airstream blows the powdered salt into the animal area 8 where it circulates returning through the door 10 which is left ajar.

In practice, a batch of 60 g is prepared and increments of this powder are allowed to rise intermittently into the air flow over a period of minutes once the breathing rate of the horses has fallen to normal. The treatment continues for 15, 30 or 45 minutes and is repeated daily.

The electronic timer 50 allows the operator to select the treatment period. An air conditioner circuit (not shown) is controlled by a thermostat to adjust the chamber temperature. Humidity is kept low by the removal of desiccant. Buttons 52 select 15, 30 or 45 minute exposure. Buttons 54, 56 cause temperature and humidity to be shown on screen 58.

Three treatments on three days suffice to dispel travel sickness. A useful optional adjunct to the treatment is a negative-ion generator 60 on the opposite wall 62.

Figure 4:
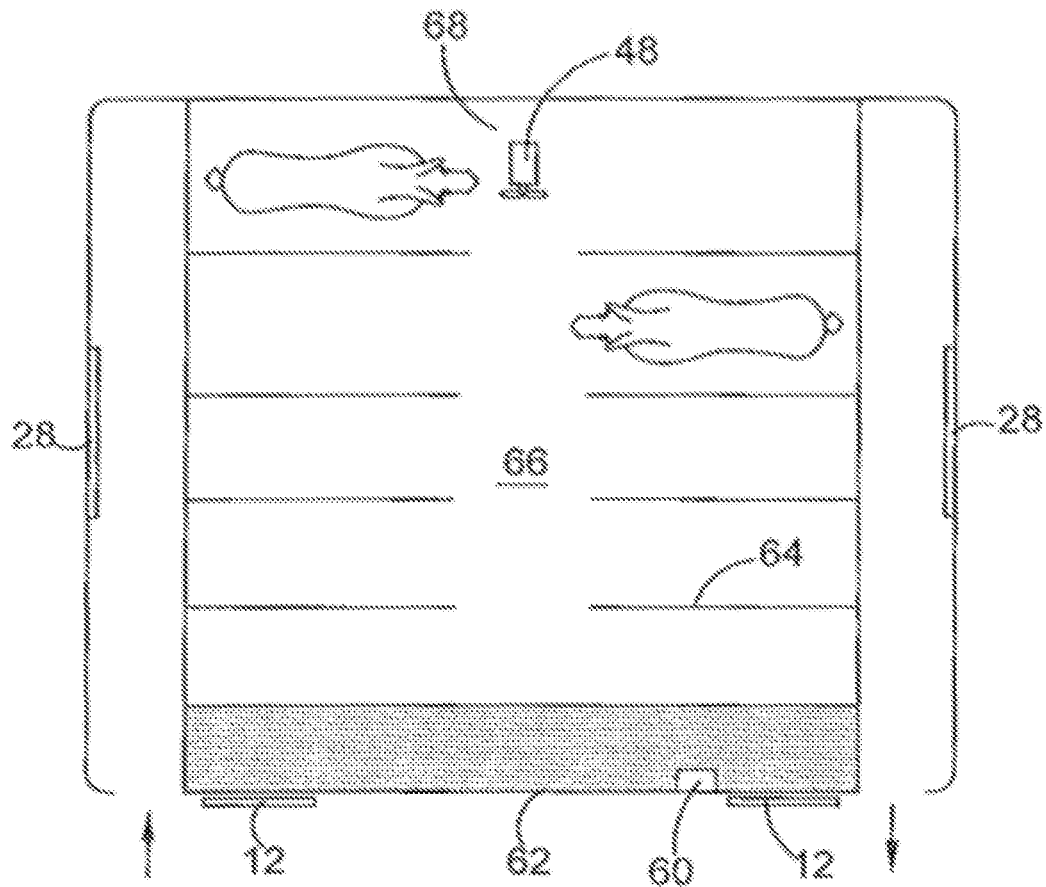
FIG. 4 is a plan of a chamber for a larger number of horses.

Referring now to FIG. 4, for large scale use, such as riding schools and racehorse training centres, a larger chamber is more suitable. The chamber shown is 7 m×7 m divided by rails 64 into spaces for individual horses.

The rails are in two rows divided by a central gap 66. At one end of the gap there is an axial flow fan 48 of 1000 l/min capacity which directs an airstream toward the opposite wall 58 through gap 66. The air circulates and reaches the space 68 behind the fan.

In a non-illustrated variant, the chamber is a trailer-mounted box like a horse box so that it may be towed by a vehicle to reach the animal, for example a zoo animal. In a further adaptation the mobile chamber is capable of treating one or more animals in the course of the journey. The chamber may alternatively form the body of a truck.

Treatment of camels with conventional medicines may affect the liver and other organs so salt therapy delivered in a quiet chamber like ours offers no harm and the ability to treat the whole animal.

The trailer may also be taken to apiaries so that hives may be stacked inside the box.

In a further embodiment of FIGS. 1 to 4 there is described a treatment chamber having a primary confined volume for treating one or more horses in a limited volume. The confined volume is substantially sealed in an operating condition, and the treatment chamber provides a means of dispensing salt crystals in an airborne suspension into the confined volume effective to allow dry contact with skin and inspiration during respiration cycle. For example, a fan and exhaust are useful as a means to produce a pressure difference airflow.

In order to allow effective contact with the skin and dispersement of salt crystals into the pulmonary system of the horse or horses in the confined volume to be treated, the treatment chamber further comprises: a confined volume defined by walls, floor and ceiling structures having a deposit of embedded granular salt, desiccant or drying agent thereon; a humidity controller for substantially maintaining the humidity of the confined volume of the treatment chamber between 15 and 40% relative humidity; a temperature controller for maintaining the temperature of the confined volume of the treatment chamber between about 20 to 40 degrees C.; a pressure controller for maintaining air pressure in the confined volume of the treatment chamber between 700 to 1000 Hpa; an airflow generator for creating an airflow stream at a rate of 500 L/min up to 1000 L/min into the confined volume of the treatment chamber; a dispenser including a comminuter and timer for delivering a predetermined amount of salt in a predetermined size at a predetermined timed interval over a treatment period, into the airflow stream to form an airborne salt suspension; wherein the physical parameters of the confined volume including temperature, pressure, airflow, humidity are controlled to allow effective contact of dry salt particles with skin of the horse or horses to be treated, and allow access to lungs for recovery of horses in the confined volume.

By controlling the ambient conditions within the confined volume of the treatment chamber, a horse or horses to be treated can be exposed to sufficiently dry salt granules and/or pulverised particulates, which improve recovery times and airway obstructions such as mucus.

In this embodiment, the treatment chamber provides a confined volume which allows control of environmental factors therein to deliver salts such as rock salt, sea salt and other type of salts and mixtures thereof, in an effective form to enhance treatments for skin aliments and inflammatory airway obstructions caused by allergies and intense activity. Applicant has found that recovery time of a horse exposed to the treatment chamber, for example following exercise/training, allows the horse to recover relatively quickly.

Without being bound by theory, the ability of the suspended salt to contact skin and disperse into the lungs from an airborne suspension relies on the ability of the salt particulate/granule to remain in airborne suspension. Therefore the higher the relative humidity of the confined volume, the more likely the suspended particles will precipitate from the airborne suspension. In a treatment environment where animals such as horses for example are perspiring heavily and expirating frequently following exercise, the ambient atmosphere is subjected to high levels of moisture and condensation, which will adversely affect delivery of salt particulates in an airborne suspension.

The applicant has found that it is not unusual for the confines of the treatment chamber to absorb and adsorb liquid in amounts exceeding 20 litres per animal during expiration and perspiration. The walls, floor and ceiling are therefore replaced from time to time and replenished with fresh salt embedded surface to assist control of relative humidity within the confines of the treatment chamber.

It is to be understood that the word "comprising" as used throughout the specification is to be interpreted in its inclusive form, ie. use of the word "comprising" does not exclude the addition of other elements.

It is to be understood that various modifications of and/or additions to the invention can be made without departing from the basic nature of the invention. These modifications and/or additions are therefore considered to fall within the scope of the invention.

I claim:

1. A treatment chamber for treating animals for measurably improving animal respiratory recovery from restricted airways having:
   a primary volume substantially sealed and confined for dispensing an airborne suspension and for animal containment, the primary volume providing for temporary accommodation of one or more animals to be treated in a limited volume;
   a pressure difference airflow generator to cause an airstream in the chamber; and
   a dispenser for adding crystalline or amorphous finely divided mineral salts which form an airborne suspension when dispensed into the airstream for treating the one or more animals by inspiration or contact with the skin;
   wherein the chamber has surfaces which are coated with at least one desiccant or drying agent in walls and on a floor of the treatment chamber for controlling humidity caused by the expiration and perspiration of the one or more animals.

2. The treatment chamber as claimed in claim 1, wherein the dispenser includes a comminutor which reduces the crystalline or amorphous mineral salts to form the finely divided mineral salts at a particle size suitable for airborne suspension.

3. The treatment chamber as claimed in claim 2, wherein the finely divided mineral salts are phosphates, sulphates, chlorides and fluorides of sodium, potassium, calcium, magnesium, or iron with a particle size in the range of 5-15φ.

4. The treatment chamber as claimed in claim 3, wherein the airstream is configured to be created by a fan.

5. The treatment chamber as claimed in claim 2, wherein the chamber has a layer of desiccant which is configured to be covered and uncovered in order to remove excess water vapour from the air.

6. The treatment chamber as claimed in claim 2, wherein the chamber includes a controller for controlling the dispensing of the finely divided mineral salts to a required rate of application.

7. The treatment chamber as claimed in claim 6, wherein the controller is configured to control the rate of application at a predetermined dispensing rate of 5, 10, 15, or 20 g/m$^3$ of the chamber volume per treatment period.

8. The treatment chamber as claimed in claim 2, wherein the chamber includes a controller for controlling the dispensing of the finely divided mineral salts to a required time of application.

9. The chamber as claimed in claim 8, wherein the controller is configured to control the time of application of the treatment for a predetermined, repeatable, treatment time of 15, 30 or 45 minutes.

10. The treatment chamber as claimed in claim 1, wherein the chamber comprises a ceiling, the floor and the walls, the walls having an upper part, wherein the upper part of the walls are covered with removable panels allowing a cleaning apparatus to regenerate the at least one desiccant or drying agent in the walls of the treatment chamber.

11. The treatment chamber as claimed in claim 10, wherein at least part of the chamber floor is impervious in order to retain the at least one desiccant or drying agent.

12. The treatment chamber as claimed in claim 10, wherein the at least one desiccant or drying agent is a mixture of vermiculite, perlite and calcium chloride.

13. The treatment chamber as claimed in claim 1, wherein the treatment chamber is adapted as a trailer body or truck body.

14. A method of treating animals comprising the steps of:
   providing a treatment chamber according to claim 1;
   confining the one or more animals to be treated in the primary substantially sealed confined volume;
   controlling humidity caused by the expiration and perspiration of the one or more animals in the confined volume by use of the at least one desiccant or drying agent;
   providing an airstream by the pressure difference airflow generator;
   dispensing finely divided mineral salts by the dispenser into the airstream to form an airborne suspension for treating the one or more animals by inspiration or contact with the skin;
   controlling the dispensing into the airstream of finely divided mineral salts in airborne suspension at a required treatment amount and time; and
   exposing the animal(s) to the airstream which contains the airborne suspension thereby contacting the cell surfaces of the animals to be treated through inspiration or skin contact.

15. The method of treating animals according to claim 14 further comprising the steps of:
   dispersing the finely divided mineral salts in an airstream created in the chamber containing the one or more animals to be treated; and
   keeping the one or more animals in the chamber for a period sufficient for the finely divided mineral salts to be consumed through inspiration by the one or more animals or deposition on the one or more animals.

16. The method of treating animals according to claim 15, wherein 5, 10, 15, or 20 g/m$^3$ of the chamber volume of the finely divided mineral salts are dispensed per treatment period.

17. The method of treating animals according to claim 16, wherein the treatment period lasts 15-45 minutes.

18. The method of treating animals according to claim 16, wherein air in the chamber is exposed to the at least desiccant or drying agent to reduce its humidity.

19. The method of treating animals according to claim 18, wherein the at least one desiccant or drying agent is calcium chloride.

20. The method of treating animals according to claim 15, wherein treatment is daily.

21. The method of treating animals according to claim 14, wherein the finely divided mineral salts are phosphates, sulphates, chlorides and fluorides of sodium, potassium, calcium, magnesium or iron.

22. A treatment chamber for treating animals for measurably improving performance and recovery from restricted airways, wherein the treatment chamber comprises:
   a substantially sealed and confined primary volume for dispensing an airborne suspension of finely divided mineral salts and for animal containment, the primary volume being adapted for closely receiving one or more animals;
   a pressure difference airflow generator to cause an airflow stream in the treatment chamber; and
   a dispenser for adding crystalline or amorphous finely divided mineral salts selected from phosphates, sulphates, chlorides and fluorides of sodium, potassium, calcium, magnesium, or iron, wherein the dispenser includes a comminutor which reduces the crystalline or amorphous mineral salts to form the finely divided mineral salts at a particle size in the range of 5-15φ, which form the airborne suspension when dispensed into the airflow stream for treating the one or more animals by inspiration or contact with the skin;

wherein the treatment chamber has an inlet, and a controller for controlling the dispensing of the finely divided mineral salts provides a functional fluid connection through the inlet in the treatment chamber to provide the airflow stream in a controlled manner with the airborne suspension of the mineral salts at a required rate and density by use of a fan and exhaust and pulsing the air suspension of mineral salts through the inlet into the treatment chamber at timed intervals over a predetermined treatment period;

said treatment chamber further comprising a humidity controller to control the amount of water vapor in the treatment chamber by the floor being impervious and having a strip of about 1 metre wide adjacent the one or more animals being treated and covered with a desiccant that is a mixture of vermiculite, perlite and calcium chloride to a depth of about 20-25 mm, to assist in maintaining a predetermined humidity for a treatment period; wherein treatment chamber surfaces are coated with the desiccant in walls and on a floor of the treatment chamber for controlling humidity caused by the expiration and perspiration of the one or more animals whereby the desiccant is effective, but spaced from the one or more animals being treated.

23. A treatment chamber for treating animals for measurably improving animal respiratory recovery from restricted airways having:

a primary volume sealed and confined sufficiently for circulation of aerosol and animal containment, the primary volume providing temporary accommodation of one or more animals to be treated in a limited volume;

a pressure difference airflow generator to cause an airstream in the chamber;

a dispenser for adding crystalline or amorphous finely divided mineral salts which form an airborne suspension when dispensed into the airstream for treating the one or more animals by inspiration or contact with the skin, wherein the dispenser includes a comminutor which reduces the crystalline or amorphous mineral salts to form the finely divided mineral salts at a particle size suitable for airborne suspension;

at least one desiccant or drying agent for controlling humidity caused by the expiration and perspiration of the one or more animals;

a controller for controlling the dispensing of the finely divided mineral salts to a required rate of application; and wherein the treatment chamber has an inlet and the controller provides a functional fluid connection through the inlet in the treatment chamber to provide the airstream in a controlled manner of the airborne suspension of the mineral salts at a required rate and density by use of a fan and exhaust and pulsing the air suspension of mineral salts through the inlet into the treatment chamber at timed intervals over a predetermined treatment period;

the treatment chamber further comprising a humidity controller to control the amount of water vapor in the treatment chamber by the floor being impervious and having a strip of about 1 metre wide adjacent the one or more animals being treated and covered with a chemical desiccant mixture of vermiculite, perlite and calcium chloride to a depth of about 20-25 mm, to assist in maintaining a predetermined humidity for a treatment period;

wherein treatment chamber surfaces are coated with the at least one desiccant or drying agent in walls and on a floor of the treatment chamber for controlling humidity caused by the expiration and perspiration of the one or more animals whereby the at least one desiccant or drying agent is spaced from the one or more animals being treated and effective to control humidity within the treatment chamber caused by expiration and perspiration of the one or more animals therein.

* * * * *